(No Model.)
T. B. ATTERBURY.
METHOD OF MANUFACTURING ORNAMENTAL GLASSWARE.
No. 366,364. Patented July 12, 1887.
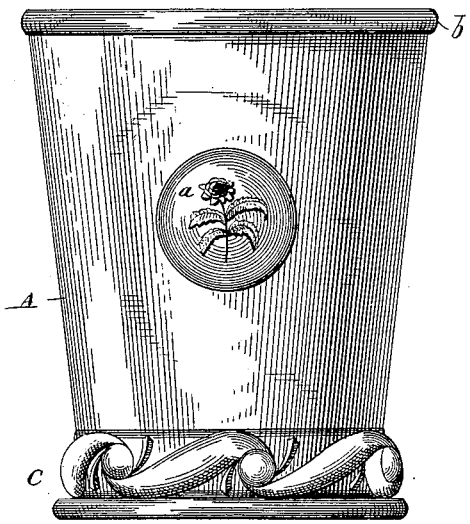
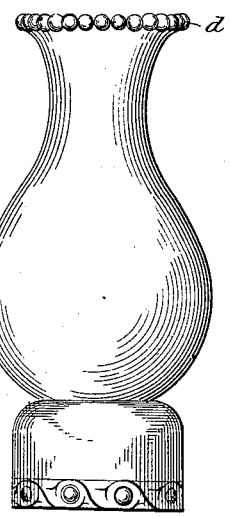
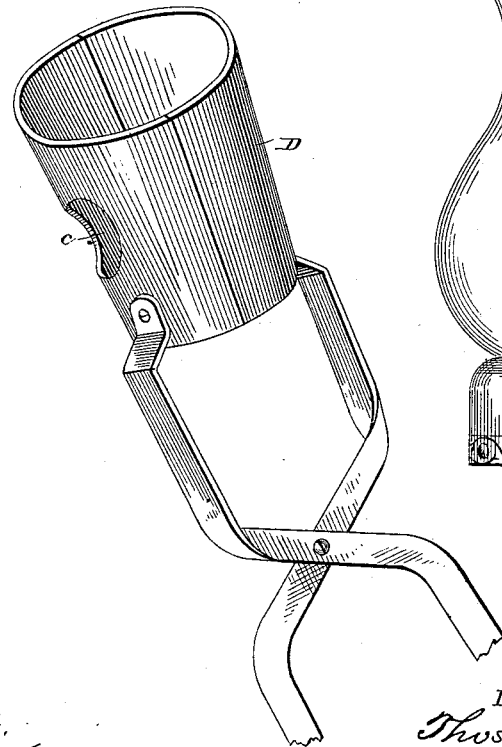
WITNESSES
INVENTOR
Thos. B. Atterbury
BY
L. W. Zinsabaugh
Attorney

United States Patent Office.

THOMAS B. ATTERBURY, OF PITTSBURG, PENNSYLVANIA.

METHOD OF MANUFACTURING ORNAMENTAL GLASSWARE.

SPECIFICATION forming part of Letters Patent No. 366,364, dated July 12, 1887.

Application filed April 20, 1887. Serial No. 235,502. (No model.)

*To all whom it may concern:*

Be it known that I, THOMAS B. ATTERBURY, a citizen of the United States, residing at Pittsburg, in the county of Allegheny, State of Pennsylvania, have invented certain new and useful Improvements in the Method of Manufacturing Ornamental Glassware, of which the following is a specification, reference being had therein to the accompanying drawings.

My invention relates to improvements in manufacturing ornamental glassware.

The object of my invention is to ornament articles of glassware with figures, flowers, bands, &c., in relief or in intaglio, in a cheap and effective manner, and yet have the effect produced by the more laborious and expensive modes of ornamenting.

My invention consists in forming the articles of any suitable kind of glass composition with ornaments of any kind, in relief or in intaglio, and then subjecting such portions of the article only that it is desired to change in color to the action of heat.

It has been the practice heretofore in ornamenting glass with designs, in relief, of different colored glass, to make such ornaments separately and join them to the main body of the article by heat or by blowing or pressing the main body of the article onto such designs while the glass was in a soft or pliable condition. It is also old to form articles of glassware from two or more different colors of glass and then by grinding or cutting away certain portions to form designs or ornaments in relief or in depression; but these processes of ornamentation are expensive and laborious.

For the sake of illustrating my invention more clearly I have shown an article of glassware in the drawings, in which—

Figure 1 is a view in perspective of a tumbler ornamented in accordance with my invention. Fig. 2 is a view in perspective of a tool or shield used in carrying out my invention. Fig. 3 is a side view of a lamp-chimney having a beaded top ornamented in accordance with my invention.

A indicates the main body of a glass tumbler, which is made of any suitable kind of glass which will change its color when exposed to heat. In this instance the main body A is transparent, while the lower portion, C, is somewhat thicker than the main body, and is ornamented with any suitable or desirable design, or any ornamental design, as $a$ in Fig. 1, may be formed on the article, either in relief or in intaglio. When the article has been formed, either by pressing or blowing, it is placed in a suitable holder or shield, D, as shown in Fig. 2, said shield being designed to cover up all the parts or portions of the article which are not to be exposed to the action of the heat.

The other portions of the article which are not protected by the shield are then subjected to the action of the heat of the "glory-hole" or other furnace, which acts on the oxides contained in the glass and changes the color of the same, so as to form a contrast between such portions and the portions which have been protected by the shield.

The shield or holder may be made of any suitable material which will not be affected by the heat, and of any suitable configuration to conform to the shape of the article to be treated; and openings of any shape may be made in the shield or holder, so as to expose certain portions of the body of the article to the action of the fire. Vines, letters, &c., may be readily formed in this way, and it will be understood that such ornamented portions are made integral with the main body of the article, so that there is no possibility of their becoming detached.

The ornaments or designs may be in bas-relief or in intaglio, and may consist of letters, figures, flowers, fruits, animals, birds, &c., and may be applied to any and all kinds of glassware, such as table-ware, beer-mugs, bottoms of all kinds of dishes, paper-weights, lamp-shades and chimneys, cake-stands, salvers, trays, &c., ring and urn jars and covers, lamps of all kinds, incandescent globes and shades, ornaments for jewelry, cameos, vases, clock stands and cases; in fact, all articles of glassware may be decorated or ornamented by my process.

It will be noticed that by the method above described I am enabled to make articles of glass in which the ornamental portions will be uniform and a predetermined result at all times insured, while the cost of manufacturing such ware is reduced to the minimum.

In making the article shown in Fig. 1 it is pressed or blown, as has been already indicated, with the ornamental portion C on the base, the flower on the enlarged portion $a$, and the rim or bead $b$ at the top. The article is now placed in the shield D, with the portions C and $b$ projecting from the end of the shield, and the ornamental portion $a$ projecting through the opening $c$ in the side of the shield or holder. The holder with the article therein is now thrust into the furnace and the exposed portions $a$, C, and $b$ subjected to the action of the fire for such a length of time as will change the color of the exposed portions. The beaded top $d$ of the lamp shade shown in Fig. 3, and such other ornaments as may be desired to be placed thereon, can be made in the same manner, the form of the holder or shield being changed to conform to the articles being made.

What I claim is—

1. The method herein described of manufacturing articles of glass having different colors, which consists in subjecting certain and predetermined portions of the article to heat, while the other portions are protected, so as to change the color of the glass in the exposed parts, as set forth.

2. The method herein described of ornamenting articles of glass, which consists in forming designs or figures on the article, whether in relief or in intaglio, and then subjecting the ornamental portions of the article to the action of heat, while the other portions are protected, so as to produce a contrast of colors between the main body of the article and the design, as set forth.

In testimony whereof I affix my signature in presence of two witnesses.

THOMAS B. ATTERBURY.

Witnesses:
D. P. BERG,
W. F. WENKE.